United States Patent
Vairavan et al.

(10) Patent No.: US 12,323,598 B2
(45) Date of Patent: Jun. 3, 2025

(54) METERING BITS IN VIDEO ENCODER TO ACHIEVE TARGETED DATA RATE AND VIDEO QUALITY LEVEL

(71) Applicant: Sony Interactive Entertainment Inc., Tokyo (JP)

(72) Inventors: Kannan Vairavan, San Mateo, CA (US); Milan Mehta, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 302 days.

(21) Appl. No.: 18/047,621

(22) Filed: Oct. 18, 2022

(65) Prior Publication Data

US 2024/0129486 A1 Apr. 18, 2024

(51) Int. Cl.
*H04N 19/146* (2014.01)
*H04N 19/114* (2014.01)
*H04N 19/124* (2014.01)

(52) U.S. Cl.
CPC ......... *H04N 19/146* (2014.11); *H04N 19/114* (2014.11); *H04N 19/124* (2014.11)

(58) Field of Classification Search
None
See application file for complete search history.

(56) References Cited

U.S. PATENT DOCUMENTS

| | | | |
|---|---|---|---|
| 2007/0206674 A1* | 9/2007 | Ziauddin | H04N 19/61 375/E7.181 |
| 2020/0257291 A1* | 8/2020 | Zhang | B60W 40/101 |
| 2020/0351504 A1 | 11/2020 | Sen et al. | |

FOREIGN PATENT DOCUMENTS

WO 2021200492 A1 10/2021

OTHER PUBLICATIONS

Wikipedia Proportional-integral-derivative controller (https://en.wikipedia.org/wiki/Proportional%E2%80%93integral%E2%80%93derivative_controller).*
"International Search Report and Written Opinion", dated Mar. 5, 2024, from the counterpart PCT application PCT/US23/76743.

* cited by examiner

*Primary Examiner* — Xiaolan Xu
(74) *Attorney, Agent, or Firm* — Kilpatrick Townsend & Stockton LLP (57) ABSTRACT

For stability of a bit rate for groups of pictures (GOPs), a rate buffer bit controller feedback loop and a proportional integral derivative (PID) bit controller feedback loop may be used to maintain at least one video buffer.

18 Claims, 6 Drawing Sheets

Rate Control Algorithm

METERING BITS IN VIDEO ENCODER TO ACHIEVE TARGETED DATA RATE AND VIDEO QUALITY LEVEL

FIELD

The present application relates generally to metering bits in a video encoder to achieve a targeted data rate and video quality level.

BACKGROUND

Virtual cloud networks (VCNs) can be used for network video delivery. As understood herein, however, issues can arise as the network bit rate even from one group of pictures (GOP) to another GOP is unstable, risking overfilling or underfilling the input buffer to the encoder. There are currently no adequate solutions to the foregoing computer-related, technological problem.

SUMMARY

A GOP may be a short sequence of video frames within a video stream (e.g., a stream for a single piece of video content such as a movie or Internet video). As understood herein, VCN firmware may be executed to stably meter and maintain a desired bit rate per GOP for quality purposes. A device executing consistent with present principles may thus keep, as best as possible, an output buffer at a desired level of bits ready to output for display without overfilling or underfilling.

Accordingly, in one aspect an apparatus includes at least one processor configured to maintain at least one video buffer according to a rate buffer bit controller feedback loop and a proportional integral derivative (PID) bit controller feedback loop. The PID bit controller feedback loop includes first, second, and third branches in parallel with each other and each receiving a feedback error. The first branch is configured to correct a target bit rate based at least in part on the feedback error for a first term. The second branch is configured to correct the target bit rate based at least in part on the feedback error for a second term longer than the first term. The third branch is configured to reduce overshoot.

In some example implementations, the at least one processor may be configured to use a predefined first quantization parameter (QP) for a first I frame of a group of pictures (GOP), where the first I frame may be an initial I frame of the GOP. In these example implementations, the at least one processor may also be configured to use a second QP for a second I frame of the GOP, where the second QP may be determined by the at least one processor from a third QP of a previous I frame in the GOP and a fourth QP of a last non-I frame of the GOP that preceded the second I frame. The third QP may or may not be different from the first QP. The previous I frame may be a last I frame in the GOP that preceded the second I frame and the second QP may be determined from an average of the third QP and the fourth QP. Additionally, if desired the second I frame may be from a same scene as the first I frame, where the same scene may be a first scene and where the at least one processor may be configured to use a fifth QP for a third I frame of the GOP. The third I frame may be for a second scene different from the first scene, and the fifth QP may be determined by the at least one processor from an average of two or more QPs of preceding I frames from the GOP. The two or more QPs of preceding I frames may be associated with the first scene.

Additionally, in some examples the processor may be configured to determine a QP for a non-I frame based on execution of the rate buffer bit controller feedback loop and the PID bit controller feedback loop.

Still further, in some examples the first branch may use a first constant $K_P$ to correct the target bit rate based at least in part on the feedback error for the first term, the second branch may use a second constant $K_I$ to correct the target bit rate based at least in part on the feedback error for the second term, and the third branch may use a third constant $K_D$ to reduce overshoot. So, for example, the first, second, and third constants may be non-negative numbers determined using a machine learning-based model, the first branch may apply the function $K_P$ (PIDE(n)), the second branch may apply the function $K_I$ ($\int_0^n$PIDE(n)dn), and the third branch may apply the function $K_D$ (d PIDE(n)/dn).

In certain example embodiments, the apparatus may include an encoder device and the at least one video buffer may be maintained by the at least one processor at the encoder device. Additionally or alternatively, the apparatus may include a decoder device and the at least one video buffer may be maintained by the at least one processor at the decoder device.

In another aspect, a method includes executing a rate buffer bit controller feedback loop, executing a proportional integral derivative (PID) bit controller feedback loop, and maintaining at least one video buffer according to the rate buffer bit controller feedback loop and the proportional integral derivative (PID) bit controller feedback loop.

In certain examples, the method may include processing a first feedback error for a first term via a first branch of the PID bit controller feedback loop to correct a target bit rate, processing a second feedback error for a second, longer term via a second branch of the PID bit controller feedback loop to correct the target bit rate, and processing a third feedback error via a third branch of the PID bit controller feedback loop to reduce overshoot. Thus, in one example implementation the first branch may use a first constant $K_P$ and the function (PIDE(n)) to correct the target bit rate based at least in part on the first feedback error for the first term, the second branch may use a second constant $K_I$ and the function $K_I$ ($\int_0^n$PIDE (n)dn) to correct the target bit rate based at least in part on the second feedback error for the second term, and the third branch may use a third constant $K_D$ and the function $K_D$ (d PIDE(n)/dn) to reduce overshoot.

Also in some example implementations, the method may include using a predefined first quantization parameter (QP) for a first I frame of a group of pictures (GOP), where the first I frame may be an initial I frame of the GOP. In these example implementations, the method may also include using a second QP for a second I frame of the GOP, where the second QP may be determined from an average of a third QP of a previous I frame in the GOP and a fourth QP of a last non-I frame of the GOP that preceded the second I frame.

In still another aspect, a device includes at least one computer storage that is not a transitory signal and that includes instructions executable by at least one processor to use a proportional integral derivative (PID) bit controller feedback loop to maintain at least one video buffer. The PID bit controller feedback loop includes first, second, and third branches in parallel with each other and each receiving a feedback error. The first branch is configured to correct a target bit rate based at least in part on the feedback error for a first term. The second branch is configured to correct the target bit rate based at least in part on the feedback error for a second term longer than the first term. The third branch is configured to reduce overshoot.

In some example embodiments, the instructions may also be executable to use a rate buffer bit controller feedback loop and the PID bit controller feedback loop to maintain the at least one video buffer.

Also in some example embodiments, the first branch may use a first constant $K_P$ and the function (PIDE(n)) to correct the target bit rate based at least in part on the feedback error for the first term, the second branch may use a second constant $K_I$ and the function $K_I$ ($\int_0^n$PIDE (n)dn) to correct the target bit rate based at least in part on the feedback error for the second term, and the third branch may use a third constant $K_D$ and the function $K_D$ (d PIDE(n)/dn) to reduce overshoot.

The details of the present application, both as to its structure and operation, can be best understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Figure 1:
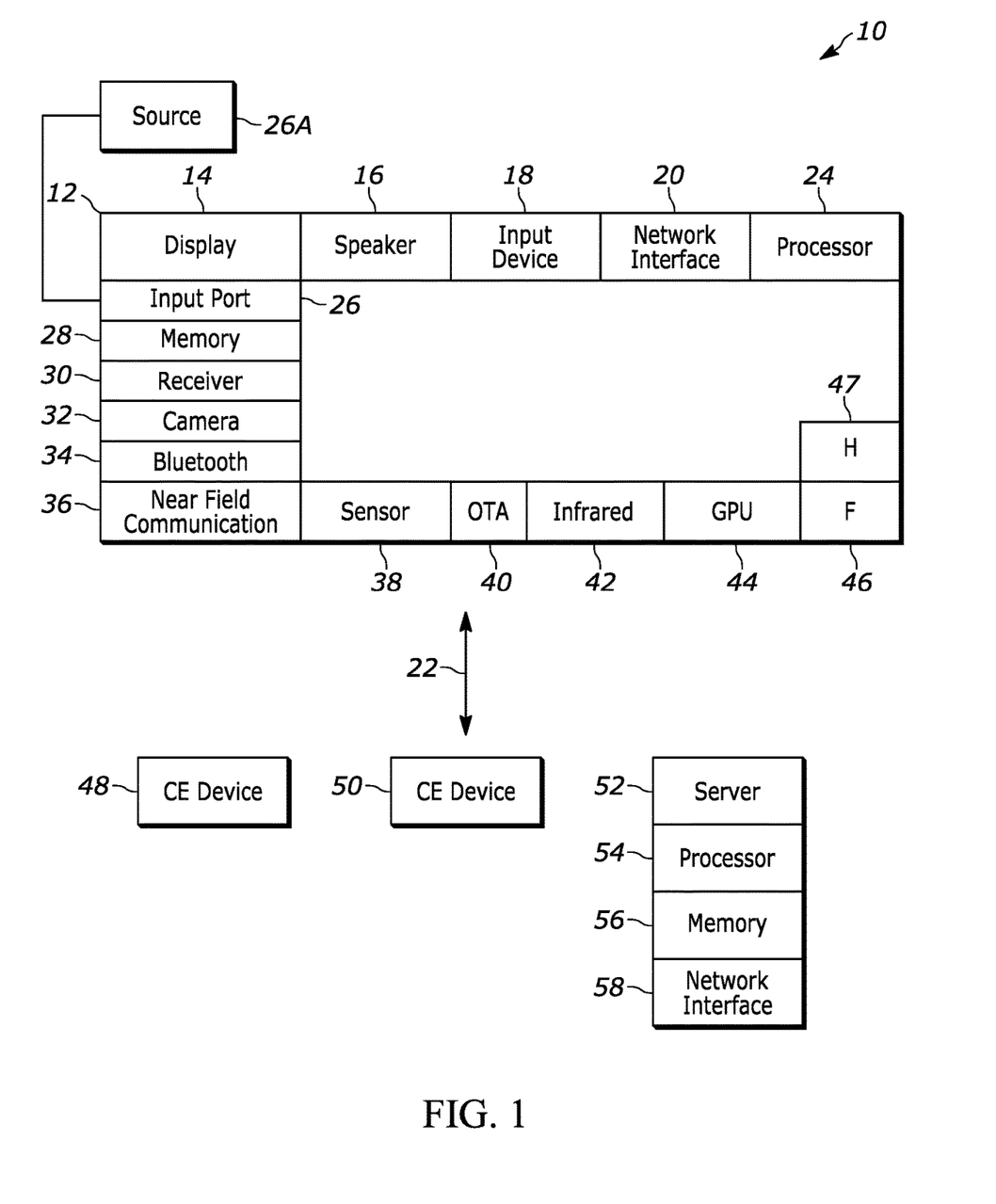
FIG. 1 is a block diagram of an example system in accordance with present principles.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
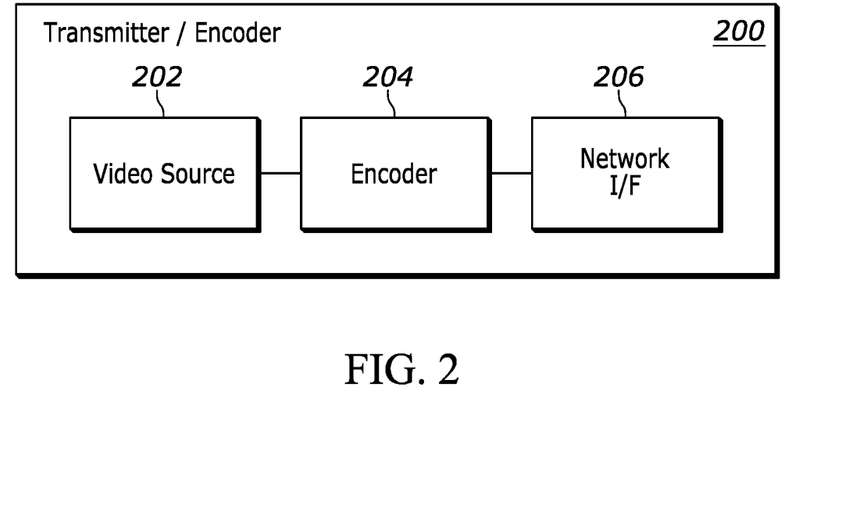
FIG. 2 is a block diagram of an example encoder device consistent with present principles.

Now in reference to FIG. 2, at least one example transmitter/encoder device 200 is shown. The device 200 may be established by, for example, a device of FIG. 1 such as one or more servers maintaining and managing a VCN to provide GOPs of video. The video may be established by computer game video or other interactive video, or even video for other audio/video content such as motion pictures, Internet-based tube videos, videos embedded in websites, videos streamed to a set top box through cable and satellite connections, videos provided through dedicated software applications (apps), etc.

Accordingly, FIG. 2 shows a video source 202 of the video, which may be established by persistent storage such as hard disk drives and/or solid state drives on the device 200 or cloud server or other source. A processor in the device 200 (not shown) may thus access video from the source 202 and pass the video through an encoder 204 to encode GOPs for the video and provide the encoded GOPs to a network interface 206 of the device 200 for transmission to one or more receiver/decoder devices. The network interface 206 may be a computer network interface, a wireless telephony interface, a television broadcast or satellite or terrestrial broadcast interface, etc.

Figure 3:
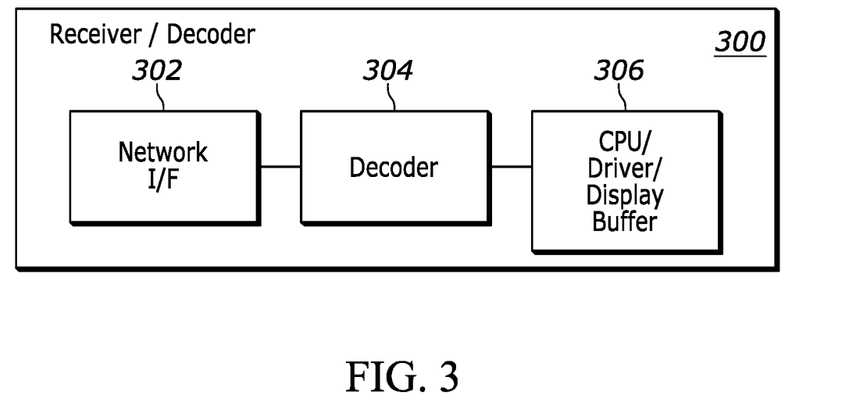
FIG. 3 is a block diagram of an example decoder device consistent with present principles.

Now in reference to FIG. 3, at least one example receiver/decoder device 300 is shown. The device 300 may receive the video of FIG. 2 via GOPs from the transmitting device 200. The device 300 may be established by, for example, a device of FIG. 1 such as a personal computer like a desktop computer, laptop computer, smartphone, headset like smart glasses or augmented or virtual reality headset, etc. Additionally or alternatively, the device 300 may be established by a computer game console, a television, a set top box, etc.

As shown in FIG. 3, the device 300 may include a network interface 302 that may receive the video/GOPs from the device 200 over a wired LAN or Wi-Fi Internet connection, a cable or satellite connection, a 5G or other wireless cellular Internet connection, etc. As such, in various examples the network interface 302 may be a computer network interface, a wireless telephony interface, a television broadcast or satellite or terrestrial broadcast interface, etc.

As the interface 302 receives GOPs from the device 200, the interface 302 may provide the GOPs to a decoder 304 to decode the GOPs. The decoder 304 may then provide the decoded GOPs to a central processing unit (CPU) or other processor of the device 300, and/or to a display driver that controls a display connected to the device 300, for placement of the GOPs into a display buffer maintained at the device 300.

Figure 4:
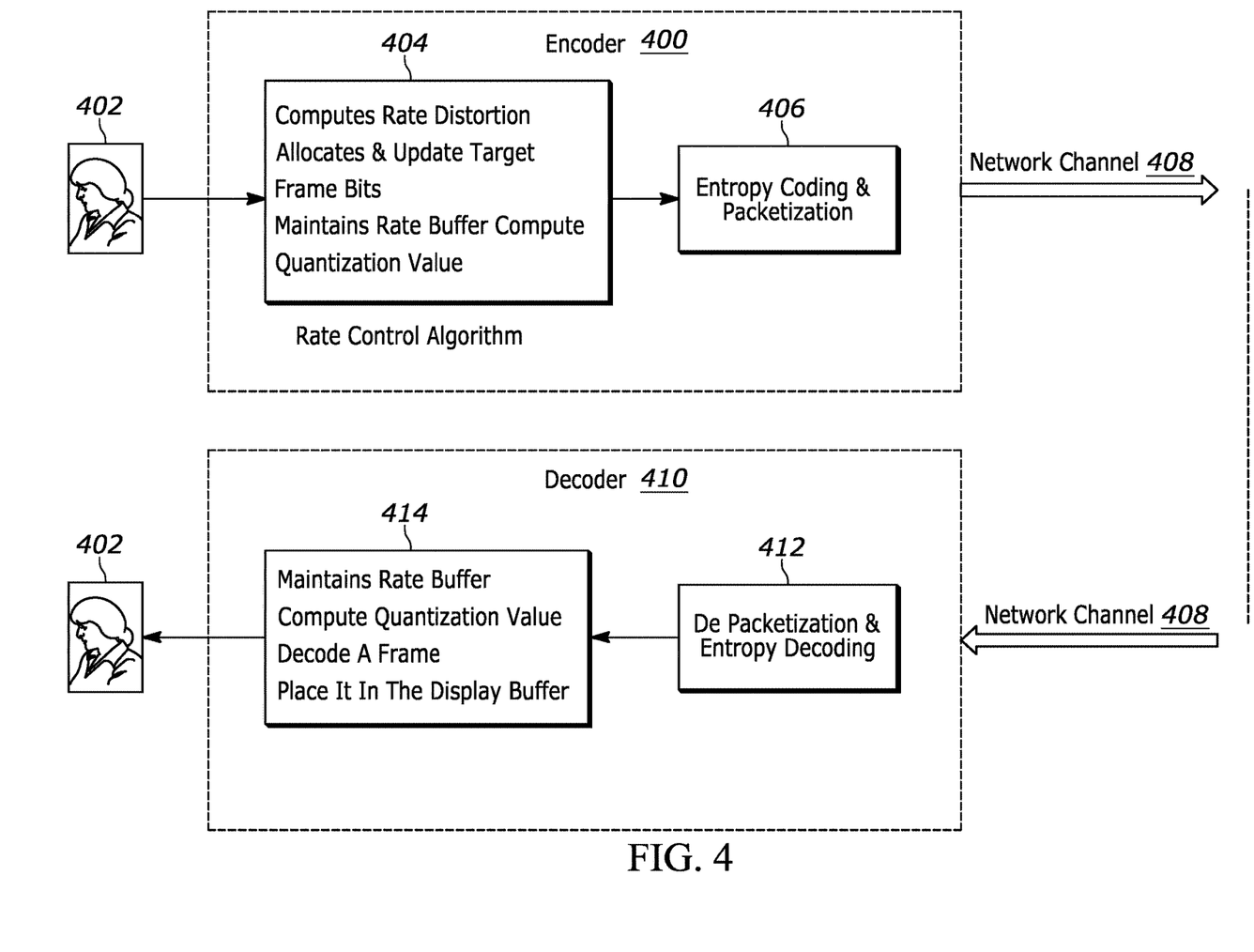
FIG. 4 is a schematic diagram of example software architecture consistent with present principles.

Continuing the detailed description in reference to FIG. 4, a schematic diagram is shown of example software architecture consistent with present principles. At an encoder device 400 (which may be established by a VCN device such as the device 200), video 402 may be accessed so that software module 404 may compute rate distortion and then allocate and update the target frame bits. Module 404 may also maintain a rate buffer and compute quantization parameters/values as will be described further below. The module 404 may then feed its computations/outputs to software module 406, which may then perform entropy coding and packetization. Entropy coding may include Huffman coding and other techniques.

Encoded packets from the module 406 may then be transmitted over one or more network channels 408 (e.g., over the Internet or another network) to a decoder device 410, which may be established by a VCN device such as the device 300. Software module 412 may then perform, on the received packets, depacketization and entropy decoding to then feed the output to software module 414. Module 414 may then maintain its rate buffer, compute quantization parameters/values, decode a respective frame from the decoded packet, and place the frame in a display buffer for the display that is being used to ultimately present the frames/video 402.

Figure 5:
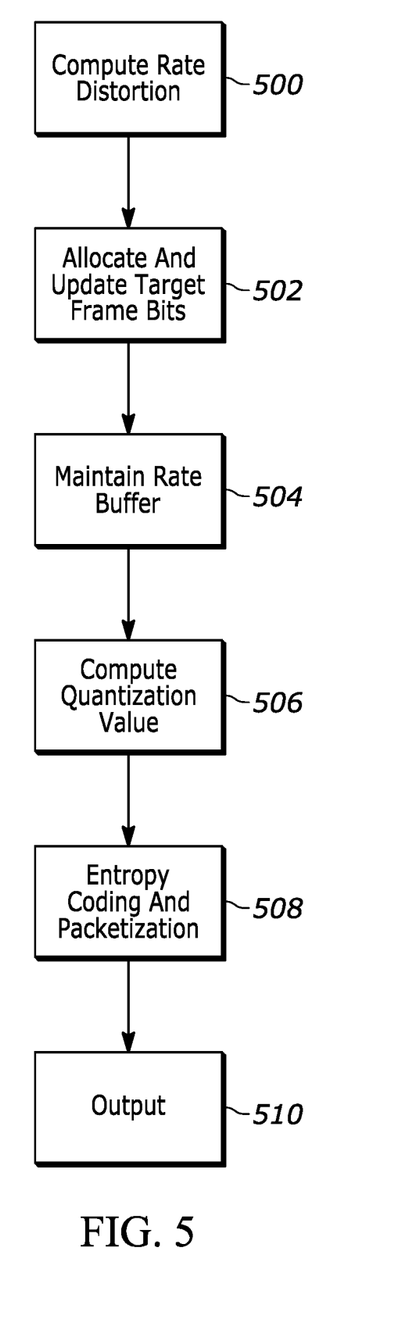
FIG. 5 shows example logic in example flowchart format that is executable by an encoder device consistent with present principles.
Figure 6:
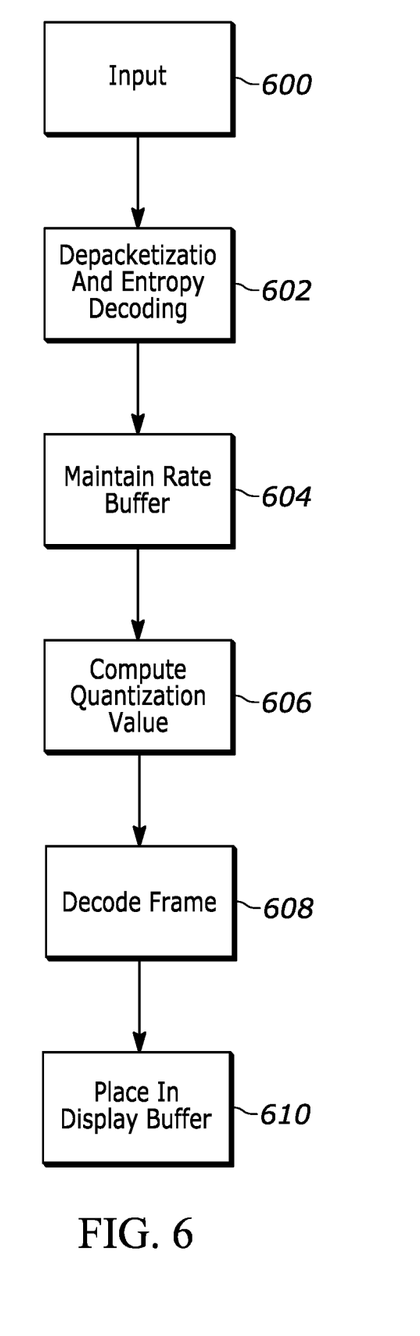
FIG. 6 shows example logic in example flowchart format that is executable by a decoder device consistent with present principles.

The example logic of FIGS. 5 and 6 further illustrates. FIG. 5 shows encoder device logic while FIG. 6 shows decoder device logic. First describing FIG. 5, at block 500 the encoder device may compute rate distortion and then move to block 502. At block 502 the encoder device may allocate and update target frame bits. The logic may then proceed to block 504 where the encoder device may maintain its rate buffer and then, at block 506, compute one or more quantization parameters/values consistent with present principles. Thereafter the logic may proceed to block 508 where the encoder device may perform entropy encoding and packetization to then output encoded packets at block 510 over a channel like the channel(s) 408 described above.

Turning now to the decoder device logic of FIG. 6, at block 600 the decoder device may receive the encoded packets output at block 510 as received over the channel(s). The logic may then proceed to block 602 where the decoder device may perform depacketization and entropy decoding. Thereafter the logic may proceed to block 604 where the decoder device may maintain its rate buffer and then proceed to block 606 where the decoder device may compute one or more quantization parameters/values consistent with present principles. Thereafter, the logic may proceed to block 608 where the decoder device may decode one or more frames to, at block 610, place the decoded frames in the display buffer for output via a display controlled by the decoder device. The display might be an LED, LCD, or OLED display for example.

Moving on from FIG. 6, it is to be understood that a rate control algorithm consistent with present principles may have two feedback loops. Specifically, the algorithm may use a PID bit controller and a rate buffer bit controller. Bit Allocation for I frames and non-I frames (such as P and B frames) may be performed as follows.

For I-frames, a predetermined/predefined QP may be used for an initial/first frame of a GOP (an independent I frame) and may be set by a designer, programmer, etc. QP for this frame may therefore be fixed (e.g., the frame does not go through any processing to get the QP value). The rest of the I frames and non-I frames for the GOP may go through the loop process set forth herein and get a QP value. Accordingly, for periodic I frames of remaining frames in the same GOP and that are for a same scene within the GOP, the QP may be computed as the average of the QP of the last frame and the QP of the last I frame. For non-periodic I frames of the same GOP but that establish a scene change/different scene, the QP may be computed as the average QP from the past I frames of the same GOP. Then for non-I frames, the QP may be derived from the PID-based rate controlled algorithm.

Figure 7:
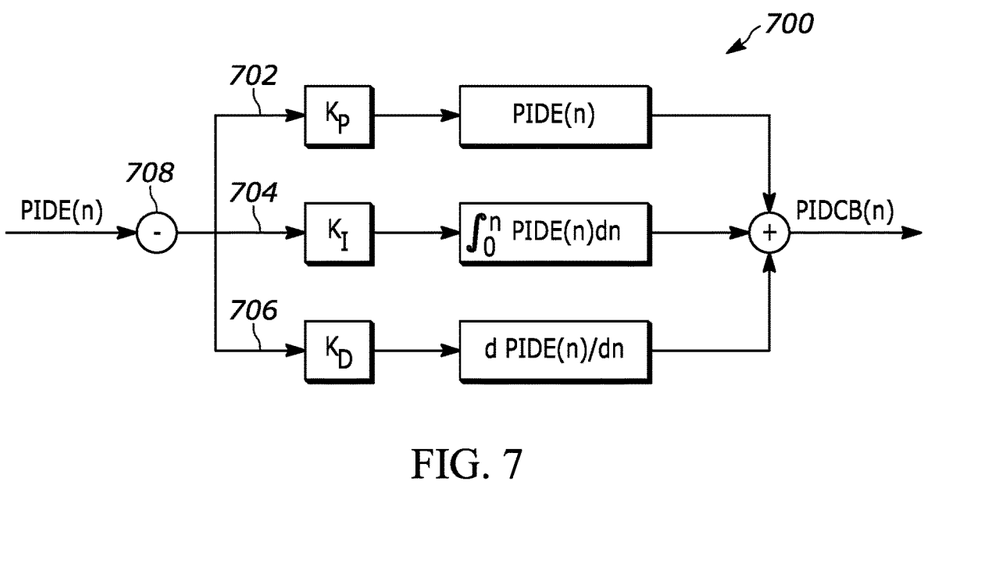
FIG. 7 shows an example proportional integral derivative (PID) bit controller feedback loop consistent with present principles.

Thus, per FIG. 7 the algorithm may maintain at least one video buffer according to a rate buffer bit controller feedback loop (not shown in FIG. 7) and a proportional integral derivative (PID) bit controller feedback loop 700. The PID bit controller feedback loop 700 may include first, second, and third branches 702-706 in parallel with each other and each receiving a feedback error 708. The feedback error may be PIDE(n) as shown in FIG. 7.

The first branch 702 may be configured to correct a target bit rate based at least in part on the feedback error for a first, shorter term. The second branch 704 may be configured to correct the target bit rate based at least in part on the feedback error for a second, longer term longer. The third branch 706 may be configured to reduce overshoot.

Thus, as shown in FIG. 7, the first branch 702 may use a first constant $K_P$ to correct the target bit rate based at least in part on the feedback error for the first term, the second branch 704 may use a second constant $K_I$ to correct the target bit rate based at least in part on the feedback error for the second term, and the third branch 706 may use a third constant $K_D$ to reduce overshoot. The first, second, and third constants may be positive numbers/control parameters determined using a machine learning-based model that learns and/or empirically determines the optimal respective constant.

As also shown in FIG. 7, PIDE may be PID error and therefore the first branch 702 may apply the function $K_P$ (PIDE(n)), the second branch 704 may apply the function $K_I$ ($\int_0^n$PIDE(n)dn), and the third branch 706 may apply the function $K_D$ (d PIDE(n)/dn). The result of the function from each branch 702-706 may then be added together to render an output PIDCB(n).

The PID-based bit controller as shown in FIG. 7 may thus use a proportional-integrated-derivative method so that the overall logic executed by the associated device may use the PID bit controller algorithm of FIG. 7 along with a rate control algorithm (e.g., a rate buffer bit controller feedback loop as will be described further below) in controlling a rate buffer, channel bit allocation, and determining quantization values consistent with present principles.

Thus, $K_p$ may be a strong control power that corrects target proportional to error, short term. $K_i$ may reduce error, long term. $K_d$ may reduce overshoot. The following equations may then be used as part of the PID controller:

PIDCB(n)=PID Controller Bits at nth frame

PIDCB(n)=PIDK$_P$(n)+PIDK$_I$(n)+PIDK$_D$(n)

PIDK$_P$(n)=$K_P$·PIDE(n)

PIDK$_I$(n)=$K_I\int_0^n$PIDE(n)dn

PIDK$_D$(n)=$K_D$·d PIDE(n)/dn

Where $K_P$, $K_I$, $K_D$ are constants, and where n is the frame number.

As indicated above, a rate control algorithm for maintaining a video buffer consistent with present principles may have two feedback loops/controllers—the PID bit controller and the rate buffer controller. The target bit allocation for every frame may be calculated based on these two feedback controllers. Stability of these two controllers is desired and thus present principles may be used to prevent unstable conditions under any given circumstances. Accordingly, as recognized herein, the constant coefficients $K_p$, $K_i$ and $K_d$ may control the stability of the PID controller. Rate buffer overflow, underflow mechanism(s) may thus control the stability of the rate buffer controller.

A predefined QP may be used for each first I frame in a GOP, and remaining I frames except scene change I frames in the same GOP may use the average of the QP of the previous frame and the QP of the last reference frame. I frames due to scene change may use the average of the past I frames' QP (e.g., from the same GOP).

QP of P and other non-I frames may be derived from the PID and rate buffer controlled target bit allocation as will be described further in reference to FIG. 9. $K_P$, $K_I$, and $K_D$ are constants which control the stability of the PID controller and can be derived from a ML-based model as indicated above. The stability of the rate buffer is controlled by the buffer fullness, which is also indirectly controlled by the PID controller.

Stability of the whole process should be maintained to meet channel rate requirements and thus maintain the quality of the video. This process can therefore be used to maintain a relatively constant, efficient channel/bit rate and video quality for each GOP across multiple GOPs for a given video in any given circumstances.

Thus, in example implementations, a predefined first QP may be used for a first I frame of a GOP, where the first I frame may be an initial I frame of the GOP. A second QP may be used for a second I frame of the GOP, where the second QP may be determined from a third QP of a previous I frame in the GOP and a fourth QP of a last non-I frame of the GOP that preceded the second I frame. The third QP may or may not be different from the first QP. The previous I frame may be a last I frame in the GOP that preceded the second I frame and the second QP may be determined from an average of the third QP and the fourth QP. Additionally, the second I frame may be from a same scene as the first I frame, where the same scene may be a first scene and where the at least one processor may be configured to use a fifth QP for a third I frame of the GOP. The third I frame may be for a second scene different from the first scene, and the fifth QP may be determined by the at least one processor from an average of two or more QPs of preceding I frames from the GOP. The two or more QPs of preceding I frames may be associated with the first scene. A QP may also be determined for a non-I frame based on execution of the rate buffer bit controller feedback loop and the PID bit controller feedback loop.

Accordingly, note that:

Channel Rate in bits (bps)=$C_R$

Frame Rate (fps)=$F_R$

Frame Channel Bits Ave=$FCB_{ave}$=$(C_R/F_R)$

PID Controller Bits=PIDCB(n)

Target Frame Bits=TFB(n)=(TargetBitAllocation(n)+PIDCB(n))

Accumulated Bit Buffer(n)=ABBuf(n)=$\Sigma_{n=0}^{EncodedFrames-1}$EncodedBits(n)

TargetBitAllocation(n)=$[C_R$-ABBuf(n)]/$[F_R$-(n-1)]

PID Error(n)=PIDE(n)=TFB(n-1)-Frame Encoded Bits(n-1)

Figure 8:
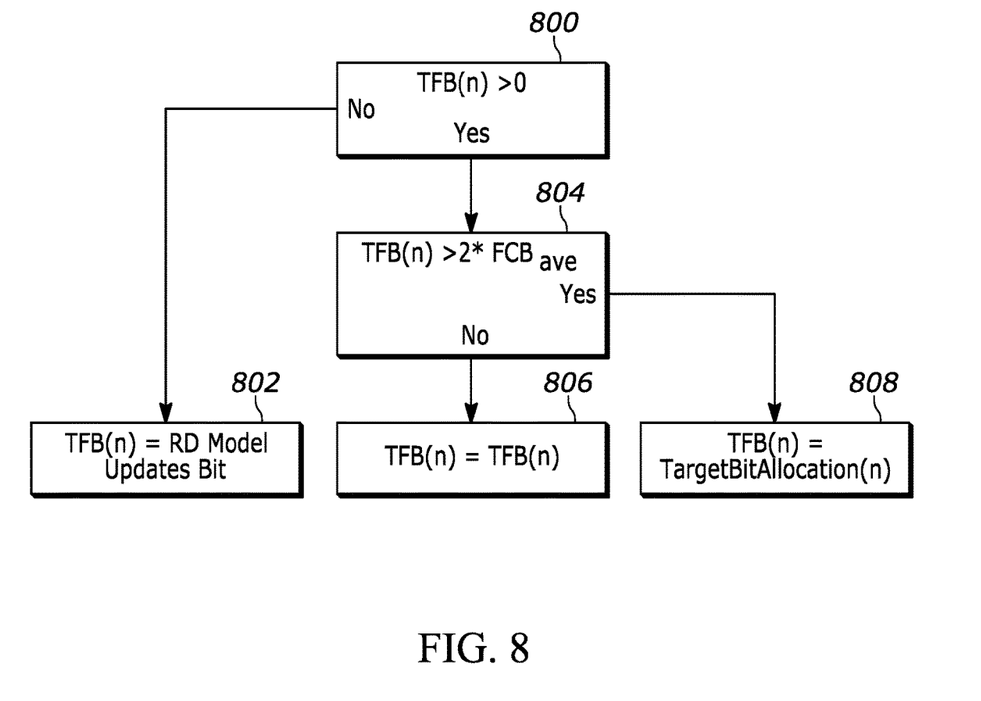
FIG. 8 shows example logic in example flowchart format for an example TFB(n) algorithm consistent with present principles.

With the foregoing in mind, reference is now made to FIG. 8, which shows example logic in flowchart form for an example TFB(n) algorithm consistent with present principles. Beginning at block 800, the device may determine whether TFB(n) is greater than zero. A negative determination at block 800 may cause the logic to proceed to block 802 where TFB(n)=RD Model Updates Bit (Rate Distortion and Rate Buffer control algorithm will compute QP and will update bits).

However, responsive to an affirmative determination at block 800, the logic may instead proceed to block 804. At block 804 the device may determine whether TFB(n) is greater than 2*$FCB_{ave}$. A negative determination at block 804 may cause the logic to proceed to block 806 where TFB(n)=TFB(n). However, an affirmative determination at block 804 may instead cause the logic to proceed to block 808 where TFB(n)=TargetBitAllocation(n).

Figure 9:
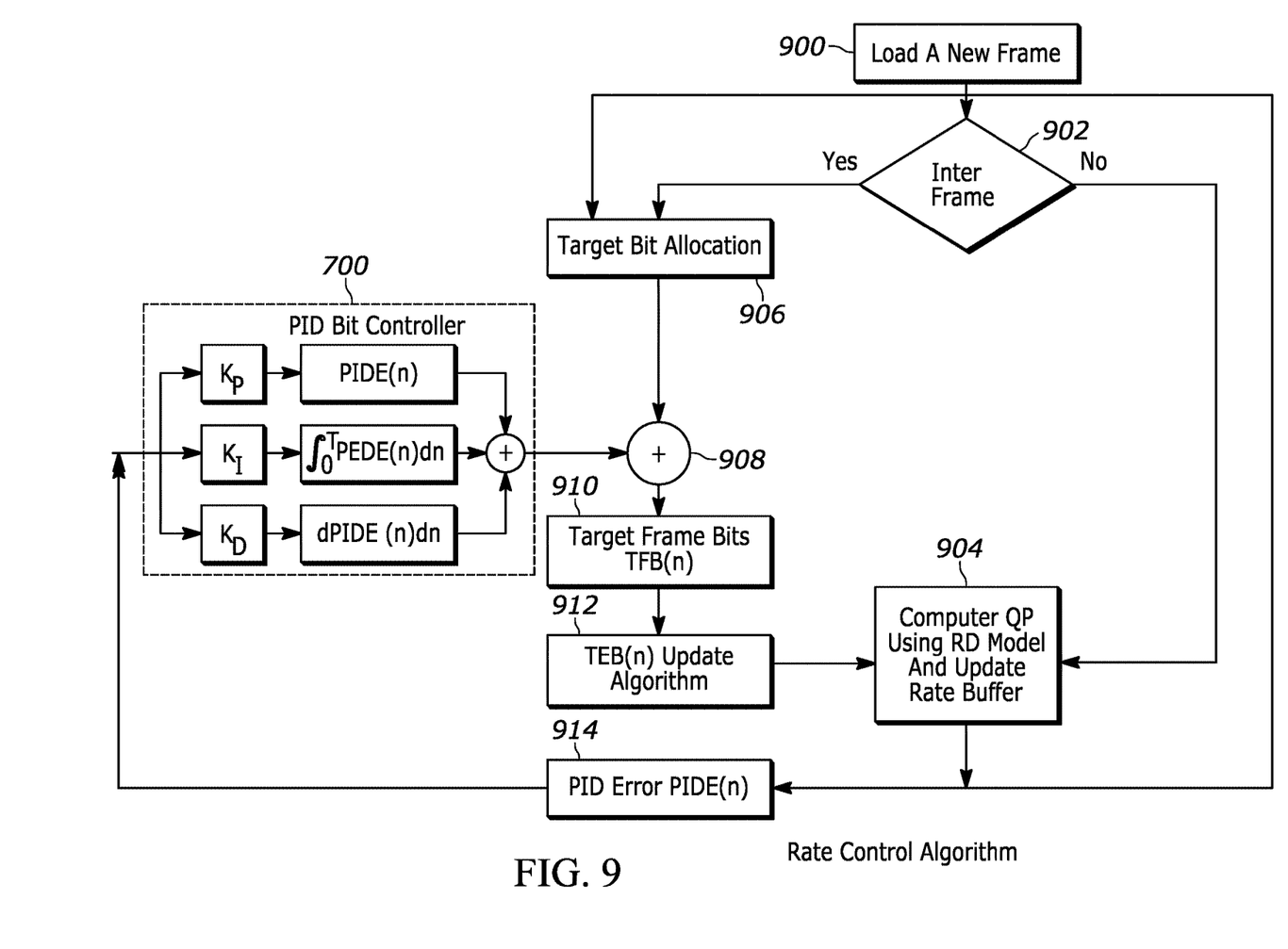
FIG. 9 shows example overall logic for rate control consistent with present principles.

With the foregoing in mind and continuing the detailed description in reference to FIG. 9, example overall logic of a rate control algorithm consistent with present principles is shown. Beginning at block 900, the device may load a new frame and then, at decision diamond 902, determine whether that frame is an I frame. A negative determination at diamond 902 may cause the logic to proceed to block 904 where the device may compute QP using the RD (rate distortion to maintain video quality) model and update the rate buffer.

However, responsive to an affirmative determination at diamond 902, the logic may instead proceed to block 906 where the device may execute target bit allocation and proceed to step 908, taking output PIDCB(n) from feedback loop 700 of FIG. 7 and determining, at block 910, the target frame bits TFB(n). The logic may then move to block 912 where the device may execute the TFB(n) update algorithm of FIG. 8.

Thereafter, the logic may proceed to block 904 where the device may compute QP using the RD model and update the rate buffer. From block 904 the logic may then proceed to block 914 where the device may take the resulting PID error PIDE(n) and feed PIDE(n) back into the loop 700 as input.

Thus, the rate buffer may be maintained at an encoder device and/or at a decoder device using the logic of FIG. 9.

While the particular embodiments are herein shown and described in detail, it is to be understood that the subject matter which is encompassed by the present invention is limited only by the claims.

What is claimed is:

1. An apparatus comprising:
   at least one processor configured to:
   maintain at least one video buffer according to a rate buffer bit controller feedback loop and a proportional integral derivative (PID) bit controller feedback loop, wherein the PID bit controller feedback loop comprises:
   first, second, and third branches in parallel with each other and each receiving a feedback error, the first branch configured to correct a target bit rate based at least in part on the feedback error for a first term, the second branch configured to correct the target bit rate based at least in part on the feedback error for a second term longer than the first term, the third branch being configured to reduce overshoot;
   use a predefined first quantization parameter (QP) for a first I frame of a group of pictures (GOP), the first I frame being an initial I frame of the GOP; and
   use a second QP for a second I frame of the GOP, the second QP determined by the at least one processor from a third QP of a previous I frame in the GOP and a fourth QP of a last non-I frame of the GOP that preceded the second I frame.

2. The apparatus of claim 1, wherein the previous I frame is a last I frame in the GOP that preceded the second I frame.

3. The apparatus of claim 1, wherein the second QP is determined from an average of the third QP and the fourth QP.

4. The apparatus of claim 1, wherein the second I frame is from a same scene as the first I frame.

5. The apparatus of claim 4, wherein the same scene is a first scene, and wherein the at least one processor is configured to:
   use a fourth QP for a third I frame of the GOP, the third I frame being for a second scene different from the first scene, the fourth QP determined by the at least one processor from an average of two or more QPs of preceding I frames from the GOP, the two or more QPs of preceding I frames being associated with the first scene.

6. The apparatus of claim 1, wherein the third QP is different from the first QP.

7. The apparatus of claim 1, wherein the processor is configured to:
   determine a quantization parameter (QP) for a non-I frame based on execution of the rate buffer bit controller feedback loop and the PID bit controller feedback loop.

8. The apparatus of claim 1, wherein the first branch uses a first constant $K_P$ to correct the target bit rate based at least in part on the feedback error for the first term, wherein the second branch uses a second constant $K_I$ to correct the target bit rate based at least in part on the feedback error for the second term, and wherein the third branch uses a third constant $K_D$ to reduce overshoot.

9. The apparatus of claim 8, wherein the first, second, and third constants are non-negative numbers determined using a machine learning-based model.

10. The apparatus of claim 8, wherein the first branch applies a function $K_P$ (PIDE(n)), wherein the second branch applies a function $K_I$ ($\int_0^n$PIDE(n)dn), and wherein the third branch applies a function $K_D$ (d PIDE(n)/dn).

11. The apparatus of claim 1, comprising an encoder device, wherein the at least one video buffer is maintained by the at least one processor at the encoder device.

12. The apparatus of claim 1, comprising a decoder device, wherein the at least one video buffer is maintained by the at least one processor at the decoder device.

13. A method, comprising:
executing a rate buffer bit controller feedback loop;
executing a proportional integral derivative (PID) bit controller feedback loop; and
maintaining at least one video buffer according to the rate buffer bit controller feedback loop and the proportional integral derivative (PID) bit controller feedback loop;
using a predefined first quantization parameter (QP) for a first I frame of a group of pictures (GOP), the first I frame being an initial I frame of the GOP; and
using a second QP for a second I frame of the GOP, the second QP determined from an average of a third QP of a previous I frame in the GOP and a fourth QP of a last non-I frame of the GOP that preceded the second I frame.

14. The method of claim 13, comprising:
processing a first feedback error for a first term via a first branch of the PID bit controller feedback loop to correct a target bit rate;
processing a second feedback error for a second term via a second branch of the PID bit controller feedback loop to correct the target bit rate, the second term being longer than the first term; and
processing a third feedback error via a third branch of the PID bit controller feedback loop to reduce overshoot.

15. The method of claim 14, wherein the first branch uses a first constant $K_P$ and a function (PIDE(n)) to correct the target bit rate based at least in part on the first feedback error for the first term, wherein the second branch uses a second constant $K_I$ to correct the target bit rate and a function $K_I$ ($\int_0^n$PIDE(n)dn) to correct the target bit rate based at least in part on the second feedback error for the second term, and wherein the third branch uses a third constant $K_D$ and a function $K_D$ (d PIDE(n)/dn) to reduce overshoot.

16. A device comprising:
at least one computer storage that is not a transitory signal and that comprises instructions executable by at least one processor to:
use a proportional integral derivative (PID) bit controller feedback loop to maintain at least one video buffer, wherein the PID bit controller feedback loop comprises:
first, second, and third branches in parallel with each other and each receiving a feedback error, the first branch configured to correct a target bit rate based at least in part on the feedback error for a first term, the second branch configured to correct the target bit rate based at least in part on the feedback error for a second term longer than the first term, the third branch being configured to reduce overshoot;
use a predefined first quantization parameter (QP) for a first I frame of a group of pictures (GOP), the first I frame being an initial I frame of the GOP; and
use a second QP for a second I frame of the GOP, the second QP determined by the at least one processor from a third QP of a previous I frame in the GOP and a fourth QP of a last non-I frame of the GOP that preceded the second I frame.

17. The device of claim 16, wherein the instructions are executable to:
use a rate buffer bit controller feedback loop and the PID bit controller feedback loop to maintain the at least one video buffer.

18. The device of claim 16, wherein the first branch uses a first constant $K_P$ and a function (PIDE(n)) to correct the target bit rate based at least in part on the feedback error for the first term, wherein the second branch uses a second constant $K_I$ to correct the target bit rate and a function $K_I$ ($\int_0^n$PIDE(n)dn) to correct the target bit rate based at least in part on the feedback error for the second term, and wherein the third branch uses a third constant $K_D$ and a function $K_D$ (d PIDE(n)/dn) to reduce overshoot.

* * * * *